United States Patent
Arimilli et al.

(10) Patent No.: US 6,944,721 B2
(45) Date of Patent: Sep. 13, 2005

(54) ASYNCHRONOUS NON-BLOCKING SNOOP INVALIDATION

(75) Inventors: Ravi Kumar Arimilli, Austin, TX (US); Guy Lynn Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 10/216,625

(22) Filed: Aug. 8, 2002

(65) Prior Publication Data

US 2004/0030843 A1 Feb. 12, 2004

(51) Int. Cl.[7] .............................................. G06F 12/08
(52) U.S. Cl. ........................ 711/146; 711/118; 711/141
(58) Field of Search ................................. 711/118, 141, 711/146

(56) References Cited

U.S. PATENT DOCUMENTS

| | | | |
|---|---|---|---|
| 5,613,153 A | * | 3/1997 | Arimilli et al. ................. 710/1 |
| 5,996,049 A | | 11/1999 | Arimilli et al. |
| 6,336,169 B1 | | 1/2002 | Arimilli et al. |
| 6,347,361 B1 | | 2/2002 | Arimilli et al. |
| 6,405,289 B1 | | 6/2002 | Arimilli et al. |

* cited by examiner

*Primary Examiner*—Pierre Vital
*Assistant Examiner*—Midys Rojas
(74) *Attorney, Agent, or Firm*—Casimer K. Salys; Dillon & Yudell LLP

(57) ABSTRACT

A method and system for avoiding live locks caused by repeated retry responses sent from a first cache memory that is in the process of manipulating a cache line that a second cache memory is attempting invalidate in the first cache memory. To a live lock condition caused by multiple caches subsequently manipulating the cache line, thus resulting in multiple retry responses back to the second cache memory, a "kill bit" is set in a snoop and read/claim (RC) queue associated with the first cache memory. The kill bit instructs the first cache memory to acknowledge the kill command from the second cache memory, but allows the first cache memory to complete the current manipulation of the cache line, after which the first cache memory kills the cache line.

18 Claims, 12 Drawing Sheets

ASYNCHRONOUS NON-BLOCKING SNOOP INVALIDATION

BACKGROUND OF THE INVENTION

1. Technical Field

The present invention relates in general to the field of computers, and, in particular, to cache memory in a multi-processor computer system. Still more particularly, the present invention relates to an improved method and system for avoiding a live lock condition that may occur when a processor's cache memory in the multi-processor computer system attempts to invalidate a cache line stored in other processors' cache memories in the multi-processor computer while the other processors' cache memories are using the cache line.

2. Description of the Related Art

The basic structure of a conventional symmetrical multi-processor (SMP) computer system 100 is shown in FIG. 1. Computer system 100 has multiple processing units 102. Each processing unit 102 communicates, via a system bus 104, with other processing units 102, input/output (I/O) devices 106 (such as a display monitor, keyboard, graphical pointer (mouse), and a permanent storage device or hard disk) and a system memory 108 (such as random access memory or RAM) that is used to dynamically store data and program instructions used by processing units 102. Computer system 100 may have many additional components which are not shown, such as serial, parallel, and universal system bus (USB) ports for connection to modems, printers or scanners. Other components not shown that might be used in conjunction with those shown in the block diagram of FIG. 1 may include a display adapter used to control a video display monitor, a memory controller to access system memory 108, etc.

Typically, each processing unit 102 includes a processor 110, which includes a processor core 112, a level-one (L1) instruction cache 114 and a level-one (L1) data cache 116. When packaged in the same chipset as the processor 110, the L1 cache memory (L1 cache) is often referred to as "on-board" cache memory. The L1 (on-board) cache communicates with system bus 104 via a level-two (L2) cache memory 118. L2 cache memory 118 includes a read/claim (R/C) queue 120 that interfaces with the L1 cache, and a snoop queue 122 that interfaces with system bus 104. Snoop queue 122 monitors ("snoops") system bus 104 for instructions to processing unit 102.

In the symmetric multi-processor (SMP) computer systems shown in FIG. 1, all of the processing units directly share the same system memory. Another conventional multi-processor computer is a non-uniform memory access (NUMA) multi-processor, such as depicted in FIG. 2. A conventional NUMA computer system 200 includes a number of nodes 202 connected by a switch 204. Each node 202, which can have the architecture of an SMP system, includes a local interconnect 206 to which a number of processing units 208 are coupled. Processing units 208 each contain a central processing unit (CPU) 210 and associated cache hierarchy 212. At the lowest level of the volatile memory hierarchy, nodes 202 further contain a system memory 214, which may be centralized within each node 202 or distributed among processing units 208 as shown. CPUs 210 access memory 214 through a memory controller (MC) 216.

Each node 202 further includes a respective node controller 218, which maintains data coherency and facilitates the communication of requests and responses (both graphically depicted as 219) between nodes 202 via switch 204. Each node controller 218 has an associated local memory directory (LMD) 220 that identifies the data from local system memory 214 that are cached in other nodes 202, a remote memory cache (RMC) 222 that temporarily caches data retrieved from remote system memories, and a remote memory directory (RMD) 224 providing a directory of the contents of RMC 222.

In any multi-processor computer system, including those depicted in FIGS. 1 and 2, it is important to provide a coherent cache memory system. Each cache line (section of cache memory), also called a cache block, in a cache memory correlates to a section of system memory. If one of the processing units 102 modifies data in that unit's cache memory (L1, L2 or other), then all of the other processors' caches in the multi-processor computer system should either receive an updated copy of the cache line reflecting the new data (write-update), or the other processors' caches should be notified that they no longer have a valid copy of the data (write-invalidate). The most common protocol for changing data in a cache is the write-invalidate method.

There are a number of protocols and techniques for achieving cache coherence when using a write-invalidate system that are known to those skilled in the art. All of these mechanisms for maintaining coherency require that the protocols allow only one processor to have "permission" allowing a write operation to a given memory location (cache line) at any given point in time. As a consequence of this requirement, whenever a processing element attempts to write to a memory location, it must first inform all other processing elements of its desire to write the location and receive permission from all other processing elements to carry out the write.

To implement cache coherency in a system, the processors communicate over a common generalized interconnect, such system bus 104 shown in FIG. 1 or switch 204 shown in FIG. 2. The processors pass messages over the interconnect indicating their desire to read from or write to memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals.

This communication is necessary because, in systems with caches, the most recent valid copy of a cache line may have moved from the system memory to one or more of the caches in the system (as discussed above). If a processor attempts to access a memory location not present within its cache hierarchy, the correct version of the cache line, which contains the actual (current) value for the memory location, may either be in the system memory or in one of more of the caches in another processing unit. If the correct version is in one or more of the other caches in the system, it is necessary to obtain the correct value from the cache(s) in the system instead of system memory.

For example, consider a processor attempting to read a location in memory. It first polls its own L1 cache. If the cache line is not present in the L1 cache, the request is forwarded to the processor's own L2 cache. If the cache line is not present in the L2 cache, the request is then presented on the generalized interconnect to be serviced. Once an operation has been placed on the generalized interconnect, all other processing units snoop the operation and determine if the cache line is present in their caches. If a given processing unit has the cache line requested in its local L2 cache, then assuming that the data is valid (has not been modified in the L1 cache of that processor), the processor sends the requested cache line to the requesting processor.

Thus, when a processor wishes to read or write a cache line, it must communicate that desire with the other processing units in the system in order to maintain cache coherence. To achieve this, the cache coherence protocol associates with each cache line in each level of the cache hierarchy, a status indicator indicating the current "state" of the cache line. The state information is used to allow certain optimizations in the coherency protocol that reduce message traffic on the generalized interconnect and the inter-cache connections.

Examples of the state information include those described in a specific protocol referred to as "MESI." In this protocol, a cache line can be in one of four states: "M" (Modified), "E" (Exclusive), "S" (Shared) or "I" (Invalid). Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when a cache line is in the Modified state, the addressed cache line is valid only in the cache memory having the modified cache line, and the modified value has not been written back to system memory. When a cache line is Exclusive, it is present only in the noted cache memory, and is consistent with system memory. If a sector is Shared, it is valid in that cache memory and in at least one other cache memory, all of the shared cache lines being consistent with system memory. Finally, when a sector is Invalid, it indicates that the addressed cache line is not resident in the cache memory. A cache line in any of the Modified, Shared or Invalid states can move between the states depending upon the particular bus transaction. While a cache line in an Exclusive state can move to any other state, a cache line can only become Exclusive if it is first Invalid.

A further improvement in accessing cache lines can be achieved using the cache coherency protocol. This improvement, referred to as "intervention," allows a cache having control over a cache line to provide the data in that cache line directly to another cache requesting the value (for a read-type operation), in other words, bypassing the need to write the data to system memory and then have the requesting processor read it back again from memory. Intervention can generally be performed only by a cache having the value in a cache line whose state is Modified or Exclusive. In both of these states, there is only one cache line that has a valid copy of the value, so it is a simple matter to source (write) the value over the bus without the necessity of first writing it to system memory. The intervention procedure thus speeds up processing by avoiding the longer process of writing to and reading from system memory (which actually involves three bus operations and two memory operations). This procedure not only results in better latency, but also increased bus bandwidth.

There are many variations of the MESI protocol. One variation of the MESI protocol is the R-MESI protocol, typically used in SMP computers. Under the R-MESI protocol, the last processor to receive a shared cache line designates the cache line as "R" (for Recently shared) instead of "S" (for Shared). This denotes that the processor with the R cache line has the exclusive right to share the line with other processors.

Another variation of the MESI protocol is used with NUMA computers uses the notation $S_L$ and $S_R$. As shown in FIG. 2, each node 202 has independent memory 214. Data in one cache 212, such as cache 212a in node 202a, may be shared with another cache 212, such as cache 212b found in node 202b. If the shared data in the cache 212a is also in memory 214a, then that data (cache line) is noted as $S_L$ in cache 212a and $S_R$ in cache 212b. Thus node 202a knows that the data is relatively close by for management purposes.

A cache transaction may require any cache memories (caches) which currently contain a value to invalidate the corresponding cache lines. For example, when a processor or I/O device issues a store operation for a particular cache line, any caches in other processors which have earlier copies of the cache line must invalidate, or "kill," those cache lines. The processing unit having the cache memory that wants to modify the cache line sends a bus transaction, called a "kill" command, to the cache memories, including L1 cache memories and L2 cache memories, in all other processing units in the system. This kill command tells the other cache memories to invalidate (kill) the cache line being modified by the first processing unit. The two main types of kill commands are called read-with-intent-to-modify (RWITM) and data claim (DClaim). The RWITM command is sent when the cache line modifying processing unit does not initially have the cache line to be modified in its cache memory, and thus must first "read" the cache line before modifying it. The DClaim command is similar to the RWITM command, except the modifying processing unit already has a copy (either a Shared copy or an Exclusive copy) of the cache line to be modified.

Typically, there are two possible responses to a kill command. One is an "ACK" (acknowledge) response, indicating that the other processing unit's cache memory has received the kill command, and has killed (invalidated) the cache line described. The other possible response is a "Retry" response. The retry response instructs the processing unit that sent the kill command to send the command again ("retry") because the kill command was not complied with. The reason for the non-compliance with the kill command may be 1) the receiving processor cache is delivering a copy of the subject cache line to the processor (R/C queue is active); 2) the receiving processor cache is delivering a shared copy of the subject cache line to another processor's cache (snoop queue is active); or 3) the receiving processor's cache snoop queue is temporarily full, and cannot receive any new commands.

One solution to the third condition described above (full snoop queue) is disclosed in U.S. Pat. No. 6,336,169 (Arimilli et al., Jan. 1, 2002), which is herein incorporated by reference in its entirety.

The present invention, however, addresses the first two reasons for a retry response (busy snoop queue or busy R/C queue).

For purposes of illustration and clarity, suppose that processing unit P0 shown in FIG. 1 issues a kill command for cache line "A." Now suppose that at the same time processing unit P30 is sending processing unit P31 a copy of cache line "A." Then processing unit P30 and/or P31 will send a retry response back to processing unit P0, since the cache line is "in flight" and under the temporary control of processing units P30 and/or P31. This condition is shown in a timing chart depicted in FIG. 3. At time 302, processing unit P30 receives an address read instruction from processing unit P31. At time 304, processing unit P31 receives an acknowledgment from P30 for the address read instruction, and awaits the delivery of cache line "A" from (typically the L2 cache in) processing unit P30. During combined response (C.R.) period 306, both processing unit P30 and processing unit P31 have combined control over cache line "A."

At time 308, processing unit P31 completes the transfer of cache line "A." The time period from time 302 to time 308 is the total time during which cache line "A" is in flight from processing unit P30 to processing unit P31. This total time is depicted as cache line busy time (CLB) 310. If during CLB 310 a kill command 312 is sent from processing unit P0, then processing unit P30 or P31 (depicted) sends a "retry" response 314 back to processing unit P0, as described above. Processing unit P0 then resends the kill command, as shown at 316. Assuming the re-sent kill command arrives without further incident, then all cache lines having cache line "A" are killed (invalidated).

With reference now to FIG. 4, there is depicted a "live lock" scenario resulting from multiple overlapping cache line busy signals (CLB) 410. For example, assume an L2 cache in processing unit $X_1$ is using cache line "A." If so, processing unit $X_1$ will issue CLB 410-1. If an L2 cache from a processing unit "0" issues a kill command 412-1, processing unit $X_1$ will respond with a retry command 414-1. Before processing unit $X_1$ completes the operation with cache line "A," a second processing unit $X_2$ may start control over cache line "A." When processing unit "0" resends a kill command 412-2, processing unit $X_2$ issues a new retry response 414-2. Likewise, a third processing unit $X_3$ may initiate control over cache line "A" before processing unit $X_2$ has completed the CLB 410-2, and so on. As depicted, a processing unit may never be able to get the other processing units in the system to acknowledge the kill command 412, due to the live lock described. A live lock can also occur under conditions in which CLB's 410 do not overlap, but are sufficiently close together to effectively block kill command from processing unit "0."

Thus, there is a need for a method and system that avoids a live lock that requires a kill command to be re-sent an indefinite number of times.

SUMMARY OF THE INVENTION

The present invention provides a method and system for avoiding live locks caused by repeated "retry" responses sent from a first cache memory that is in the process of manipulating a cache line that a second cache memory is attempting to invalidate in the first cache memory. When the first cache memory is manipulating the cache line, such as sending the cache line to a processor associated with the first cache memory, any "kill" command received by the first cache memory is rejected, and the first cache memory causes the processor to send a retry response back to the second cache memory. The retry response tells the second cache memory that the first cache memory is using the cache line, and thus the cache line is not available to be killed (invalidated) at that time, thus prompting the second cache memory to retry the kill command at a later time. However, if subsequent cache memories also manipulate the cache line, then a potential "live lock" scenario arises, in which the second cache memory is never able to invalidate the cache line in the other cache memories. To avoid such a live lock, the present invention uses a special "kill bit" in a snoop and read/claim (RC) queue associated with the first cache memory. The kill bit instructs the first cache memory to acknowledge the kill command from the second cache memory, but allows the first cache memory to complete the current manipulation of the cache line, after which the first cache memory kills the cache line.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
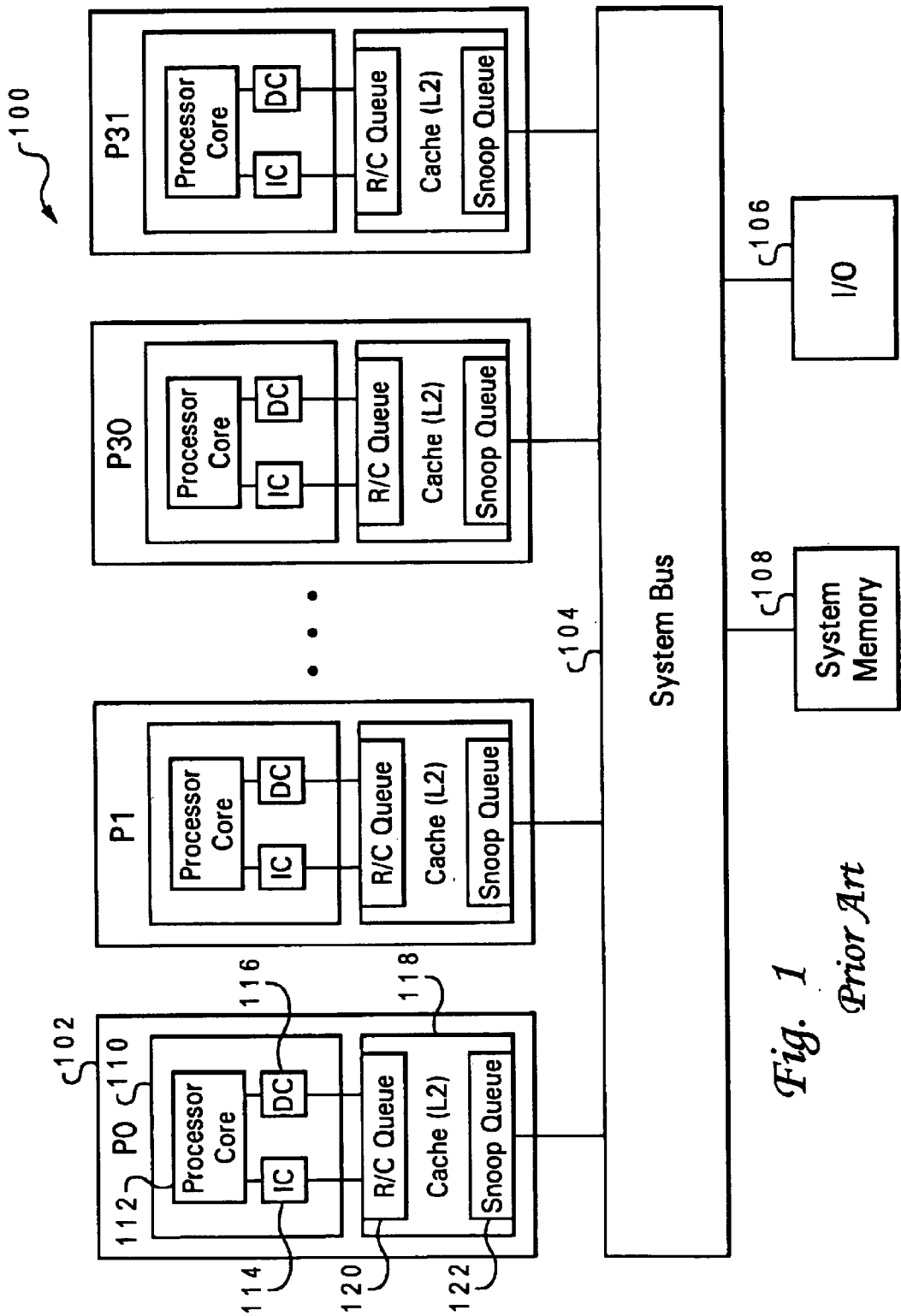
FIG. 1 is a block diagram of a prior art symmetrical multi-processor (SMP) computer.
Figure 2:
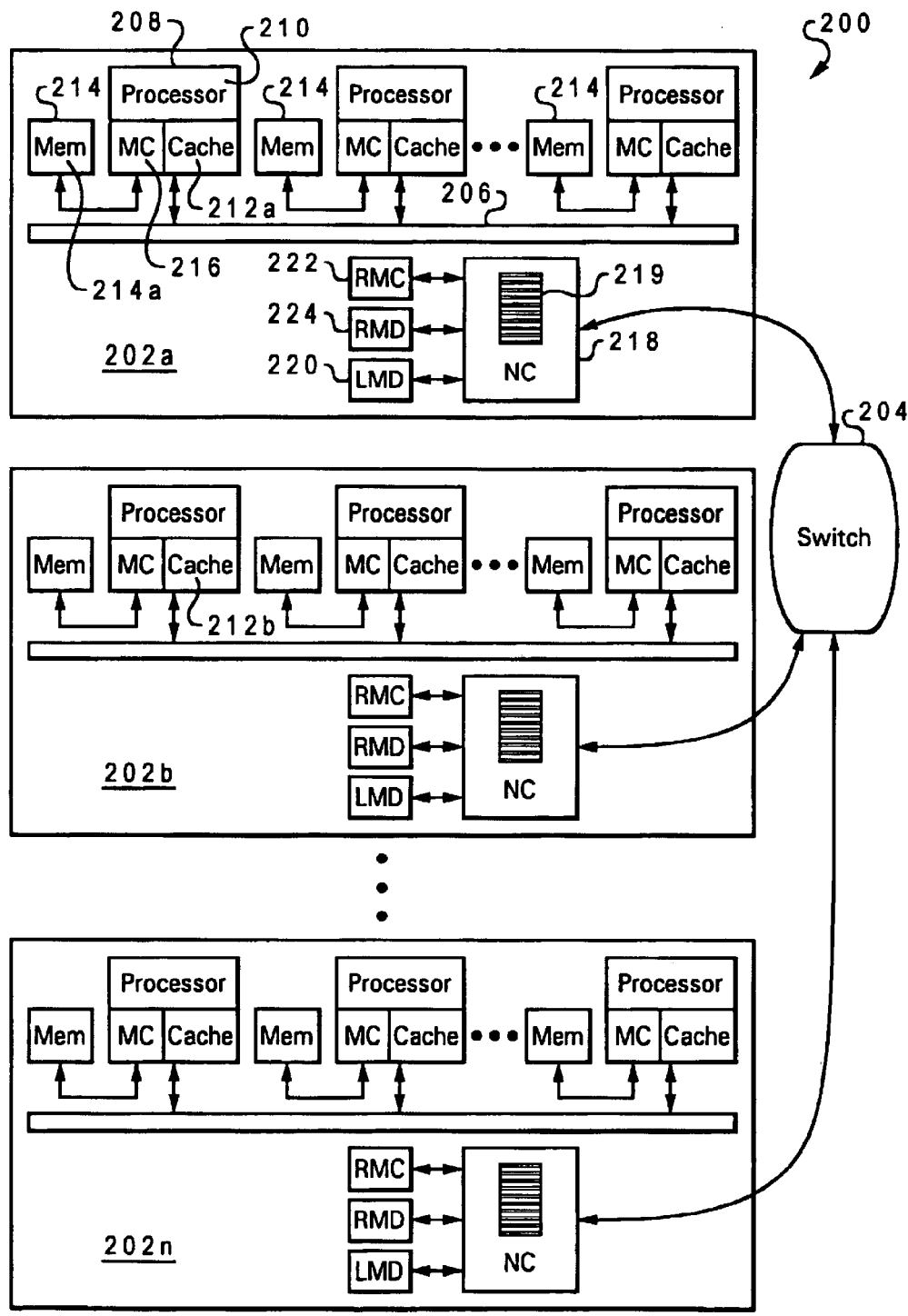
FIG. 2 depicts a prior art non-uniform multi-processor computer (NUMA)
Figure 3:
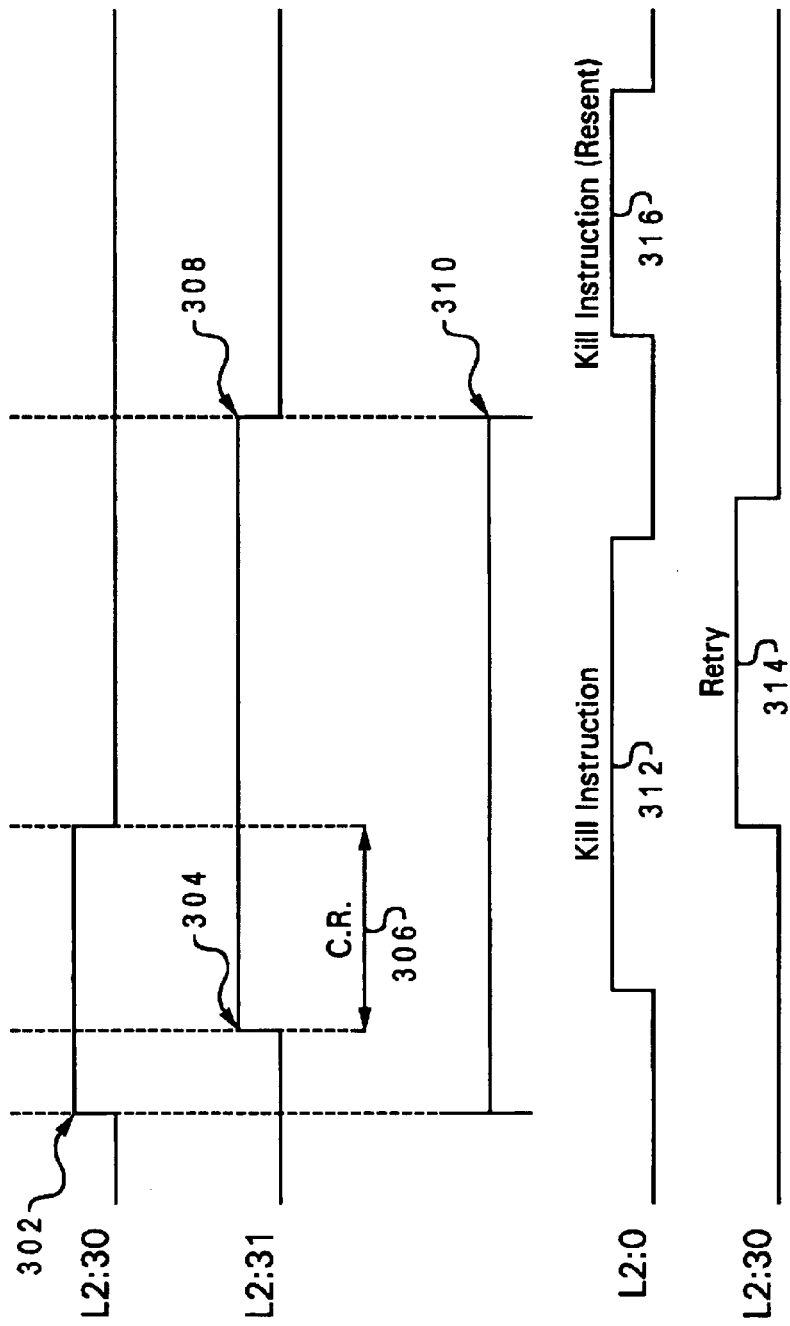
FIG. 3 illustrates a timing diagram of a kill command and a retry response used for cache coherency in the prior art.
Figure 4:
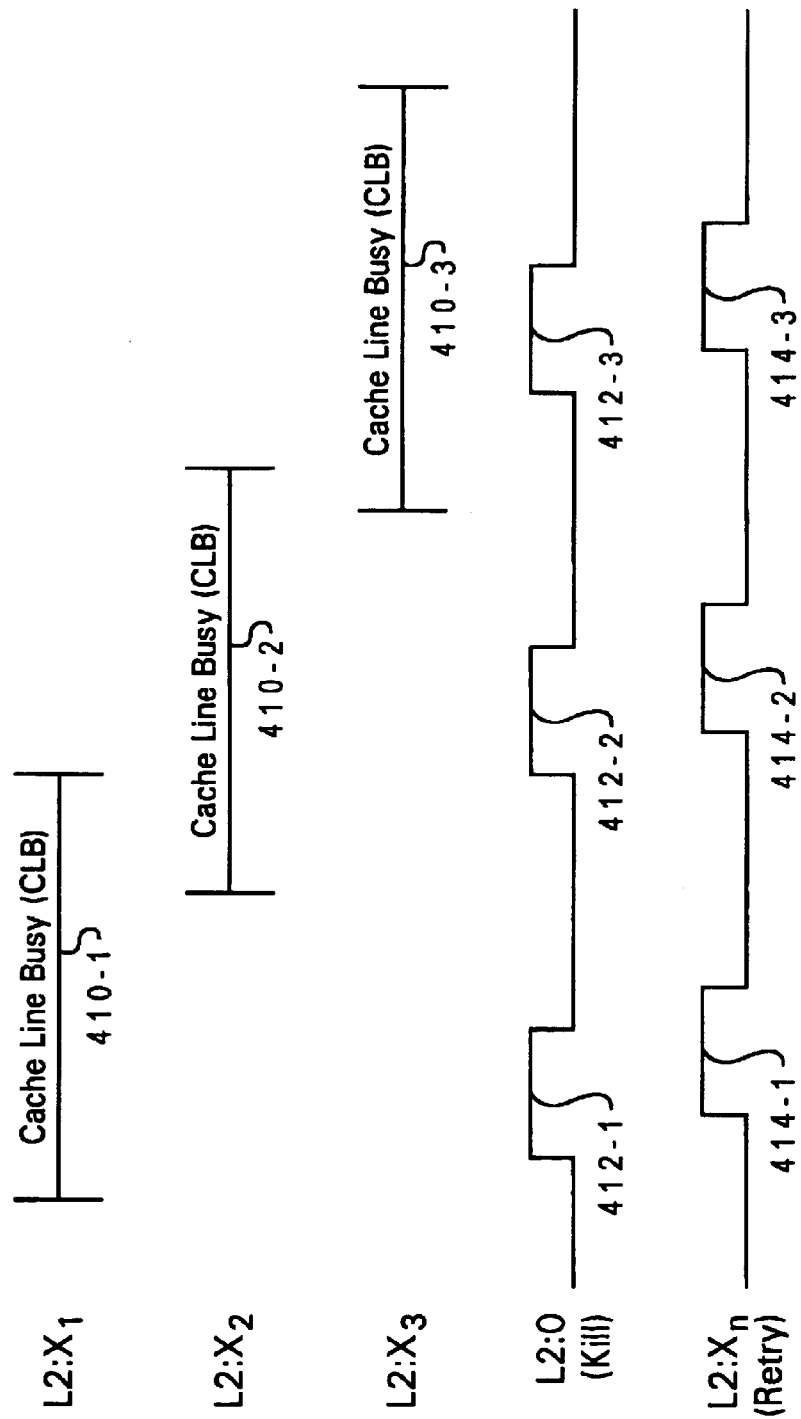
FIG. 4 depicts a live lock condition caused by the use of the prior art kill command and retry response.
Figure 5A:
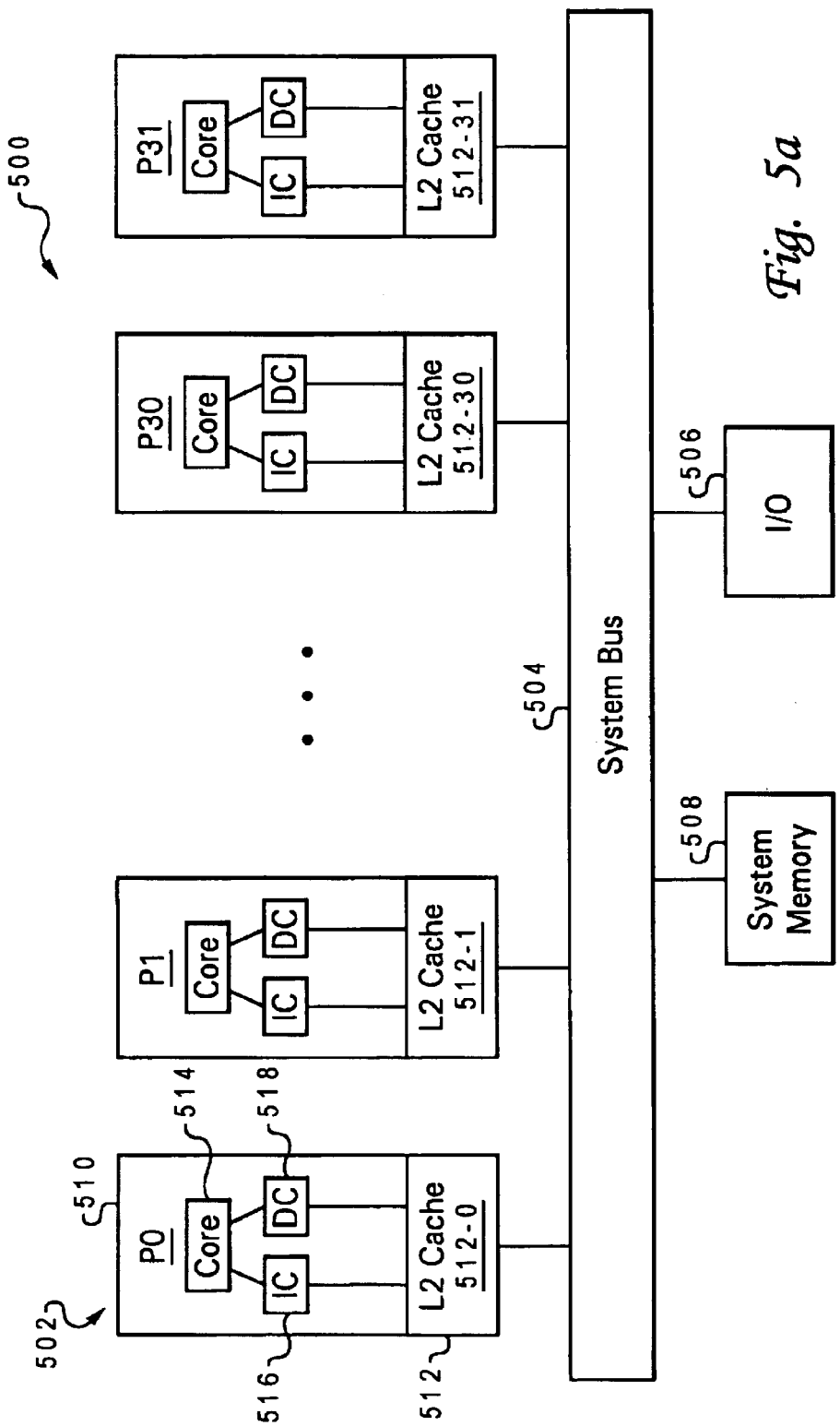
FIGS. 5a and 5b illustrate an SMP computer using the present invention's kill-bit (K-bit)

Referring now to FIG. 5a, there is depicted an exemplary symmetrical multi-processor (SMP) computer system 500 used with the present invention. Computer system 500 has multiple processing units 502. Each processing unit 502 communicates, via a system bus 504, with other processing units 502, input/output (I/O) devices 506 (such as a display monitor, keyboard, graphical pointer (mouse), and a permanent storage device or hard disk) and a system memory 508 (such as random access memory or RAM) that is used to dynamically store data and program instructions used by processing units 502. Computer system 500 may have many additional components which are not shown, such as serial, parallel, and universal system bus (USB) ports for connection to modems, printers or scanners. Other components not shown that might be used in conjunction with those shown in the block diagram of FIG. 5a may include a display adapter used to control a video display monitor, a memory controller to access system memory 508, etc.

Each processing unit 502 may either have two processors 510 or only one processor 510, as depicted. When processing unit 502 has two processors 510, the two processors 510 share a single level-two (L2) cache 512. Each processor 510 includes a processor core 514. Each processor core 514 contains a plurality of registers and execution units (not shown) for carrying out program instructions in order to operate the computer. Each processor 510 includes an instruction cache (IC) 516 and a data cache (DC) 518, which are preferably implemented using high speed memory devices. Instruction cache 516 and data cache 518 are used to temporarily store values that might be repeatedly accessed by processor core 514, in order to speed up processing by avoiding the additional latency of loading the values from system memory 508. Instruction cache 516 and data cache 518 are referred to as "level-one" (L1) cache. When integrally packaged with processor 510 on a same single integrated chip, instruction cache 516 and data cache 518 are also referred to as "on-board."

Instruction cache 516 and data cache 518 are associated with a cache controller (not shown) that manages the transfer of data and instructions between processor core 514 and cache memory, including the L1 caches (instruction cache 516 and data cache 518) as well as lower level cache, such as L2 cache 512. L2 cache 512 acts as an intermediary between system memory 508 and the L1 caches. L2 cache 512 can store a much larger amount of information (instructions and data) than the L1 caches can, but at a longer access penalty.

Although FIG. 5a depicts only a two-level cache hierarchy (L1 and L2), multi-level cache hierarchies can be provided where there are many levels (L3, L4, etc.) of serially connected caches.

Figure 5B:
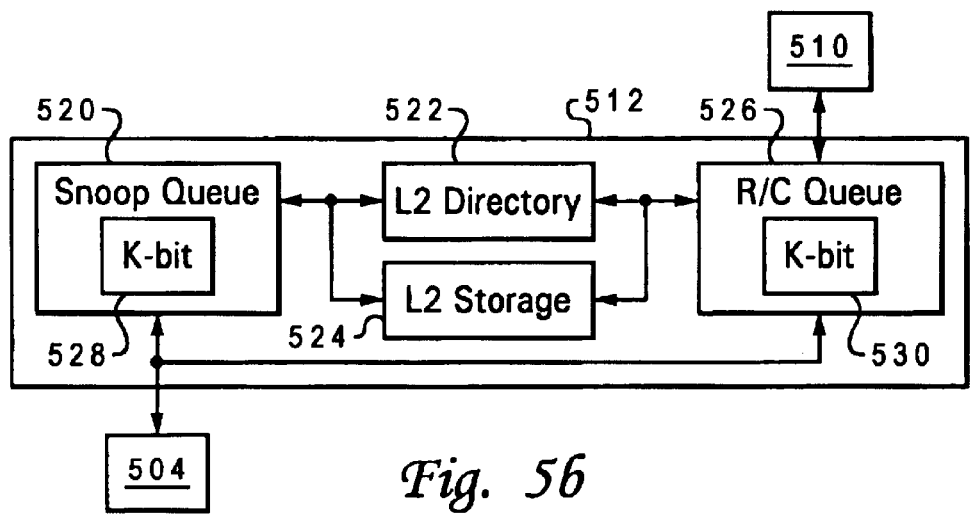

With reference now to FIG. 5b, depicted in greater detail is L2 cache 512. Within L2 cache 512 is an L2 storage 524 and an L2 directory 522. Cache lines of memory, which correspond to a line of memory in system memory 508 and L1 cache, are stored in L2 storage 524. L2 directory 522 provides a directory to identify and locate which cache lines are stored in L2 storage 524, using any method well known in the art of cache memory, including direct-mapped placement, set associative mapping (including four-way set associative mapping) or fully associative mapping.

Principal communication with system bus 504 occurs via a snoop queue 520, which snoops (monitors) requests for data in L2 cache 512 and provides a queue vehicle for sending data out onto system bus 504 responsive to the data request. Communication with processor 510 occurs via a read/claim (R/C) queue 526, which serves as a queue for data, preferably in L2 cache 512, being loaded into processor 510 or stored from processor 510.

When an L2 cache 512 wishes to modify a cache line, a kill command is sent to all other L2 caches 512 in computer system 500. For example, assume L2 cache 512-0, associated with the processor 510 labeled P0, wishes to read-with-intent-to-modify (RWITM) or data claim (DClaim) a cache line "A." The RWITM or DClaim command is sent over system bus 504 to the other L2 caches 512. Now assume that processor 510 labeled P30 is in the process of using cache line "A," such as moving cache line "A" from L2 cache 512-30 into the L1 cache of processor P31. Instead of processing unit P30 sending back a "retry" response, as in the prior art, the RWITM or DClaim command includes an instruction to set K-bit 528 in snoop queue 520 (in P30) and K-bit 530 in R/C queue 526 (in P31). As described below, setting of the K-bits results in L2 cache 512-30 and L2 cache 512-31 returning an ACK (acknowledge) response to L2 cache 512-0, and allows processors P30 and P31 to complete their operation with cache line "A." However, upon completion of the operation with cache line "A," cache line "A" is killed (invalidated) in both L2 caches 512-30 and 512-31 as well as any other level cache associated with processors P30 and P31, including L1 cache.

Software communication constructs based on the use of a semaphore (Go-flag) provides a good example of how the hardware mechanism that is the subject of the present invention will improve system performance.

Figure 6:
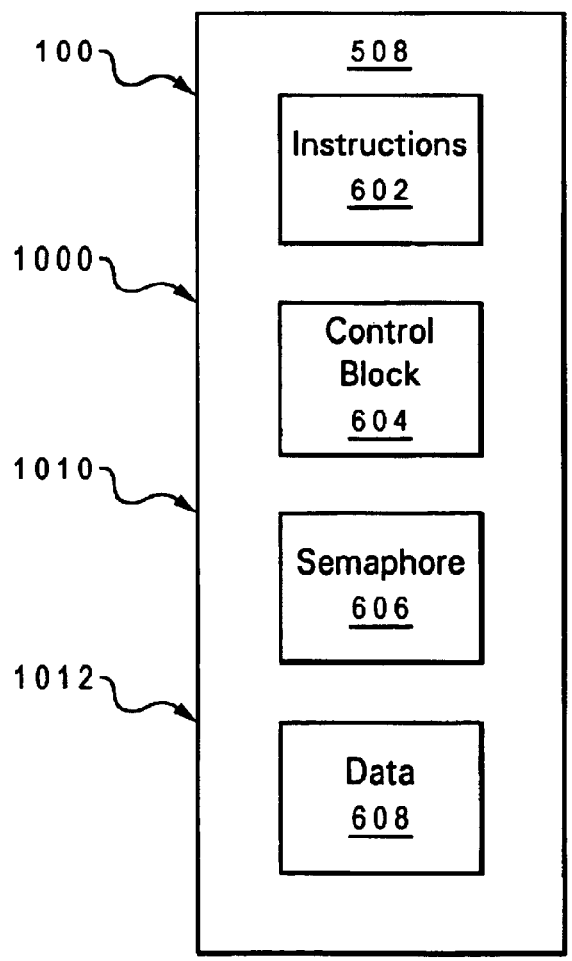
FIG. 6 depicts memory storage containing control data used with the present invention.

Assume as above that processor P0 wishes to modify a cache line, and thus causing the L2 cache to send out a kill command to the other processing units 502 in computer system 500. Processing unit P0 sets up the semaphore (Go-bit) and its control as shown in FIG. 6. For example, the general instruction code 602 may be set up in memory location $100_{10}$, control block (CB) 604 stored at location $1000_{10}$, Go-bit 606 (also known in the art as a semaphore, flag or lock variable) set at location $1010_{10}$, and data in the cache line being stored in location $1012_{10}$.

Figures 7A, 7B:
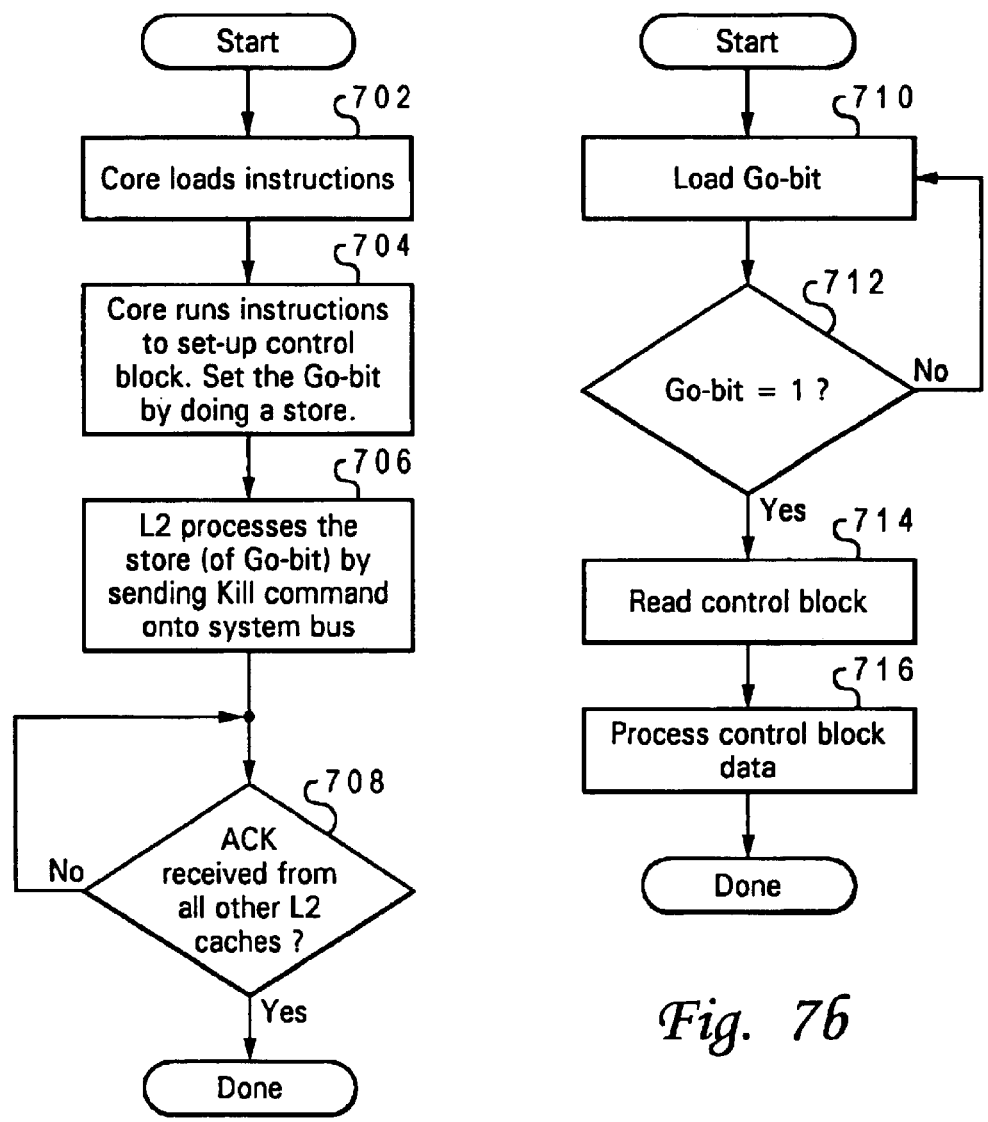
FIG. 7a is a flow chart showing steps taken by a processing unit setting up steps for sending a cache line kill command.
FIG. 7b is a flow-chart depicting how other processing units poll the system bus when a kill command is sent from a first processing unit.

As shown in the flow-chart of FIG. 7a, a first processor core loads the instructions, as depicted in block 702. As described in block 704, the core runs the loaded instructions to set up the control block. Further, the Go-bit is set by the act of doing a store of the Go-bit. As shown in block 706, the L2 cache of the first processor core then processes the store of the Go-bit by sending a kill command out onto the system bus. When an acknowledgment (ACK) response (signal) of the kill command is received from all other processing units, as described in query block 708, the process ends. As described above, an acknowledgment (ACK) response is sent indicating that the cache line has been killed at the receiving processor's cache, whether the cache line is being used by the receiving processor or not.

With reference now to FIG. 7b, there is a flow-chart depicting how other processing units poll the system bus when a kill command is sent from the first processing unit. Since the Go-bit is the semaphore indicating that a kill command is being or has been sent, each other processing unit monitors the Go-bit, as depicted in blocks 710 and 712. When the Go-bit goes to a predetermined value ("1"), then the other processing unit that is to receive the kill command reads the control block (714) and processes the control block data (716) to respond to the kill command.

Figure 7C:
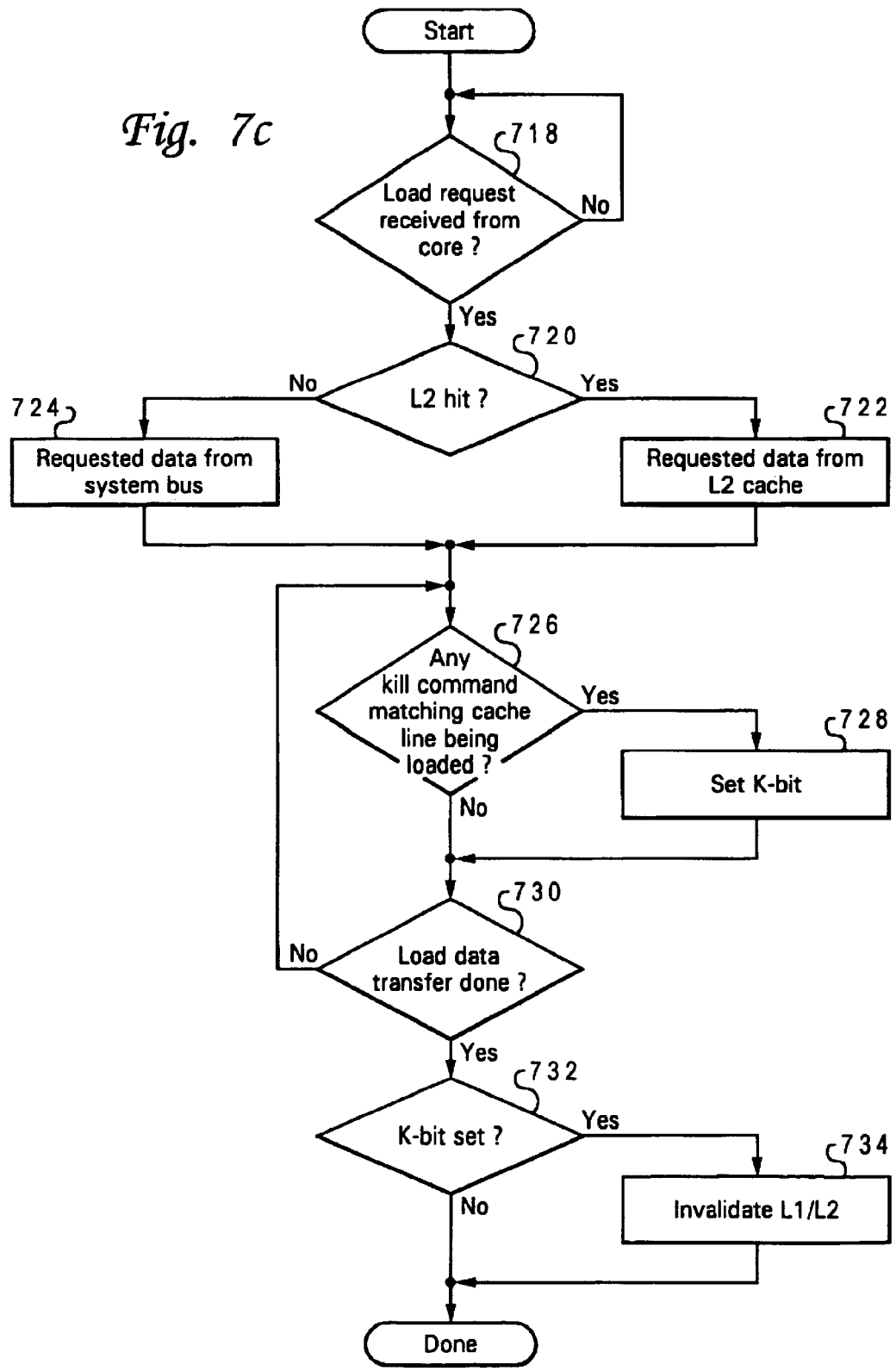
FIG. 7c is a flow-chart depicting the utilization of a kill bit (K-bit) in a read/claim (R/C) queue in a processing unit that receives a kill command while a receiving processing unit is trying to load data.

Referring now to FIG. 7c, there is a flow-chart depicting the utilization of a kill bit (K-bit) in a read/claim (R/C) queue in a processing unit that receives a kill command while the receiving processing unit is trying to load data. As shown in block 718, a query is made as to whether the core of the receiving processing unit has issued a load request. If so (720), the data is retrieved either from the processing unit's own L2 cache memory (722) or from the system bus (724). A query (726) is then made as to whether there is a kill command on the system bus to kill the cache line being loaded into the receiving processing unit's core. If there is such a kill command, then the K-bit is set in the R/C queue, as described in block 728. The load transfer is allowed to be completed, after which the cache lines in the processing unit's L1 and L2 cache memories are invalidated (killed), as described in blocks 730, 732 and 734.

Figure 7D:
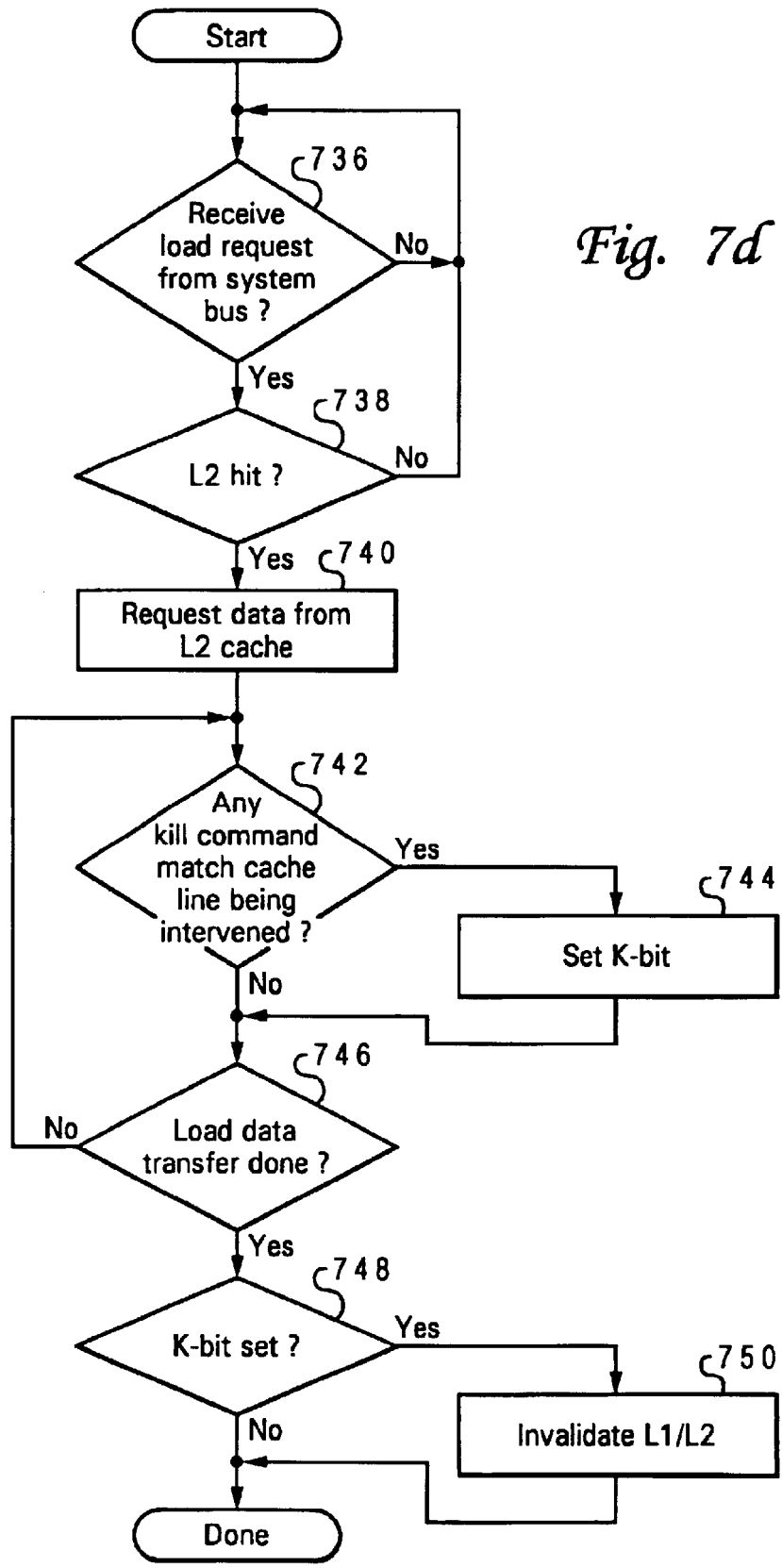
FIG. 7d is a flow-chart depicting the utilization of a K-bit in a snoop queue of a processing unit receiving a kill command.

With reference now to FIG. 7d, there is a flow-chart depicting the utilization of a K-bit in a snoop queue of a processing unit receiving a kill command. As illustrated query block 736, a query is made as to whether there is a load request from first processing unit to the receiving processing unit. If so, a query is made as to whether the receiving processing unit has the requested data in its L2 cache memory, as described in query block 738. If so, then the data is requested from the L2 cache memory, as illustrated in block 740. A query is then made (query block 742) as to whether a kill command is on the system bus for the cache line being intervened. If so, then the kill bit (K-bit) is set in the snoop queue of the L2 cache memory in the receiving processing unit, as described in block 744. A query is then made, as illustrated in query block 746, as to whether the data transfer, as described as initiating in query block 736 above, has completed. As described in block 748, if the load is complete, a query is made as to whether the K-bit was set in block 744. If the snoop queue K-bit was set, then the L1 cache memory and L2 cache memory is invalidated (killed), as described in block 750.

Figure 8A:
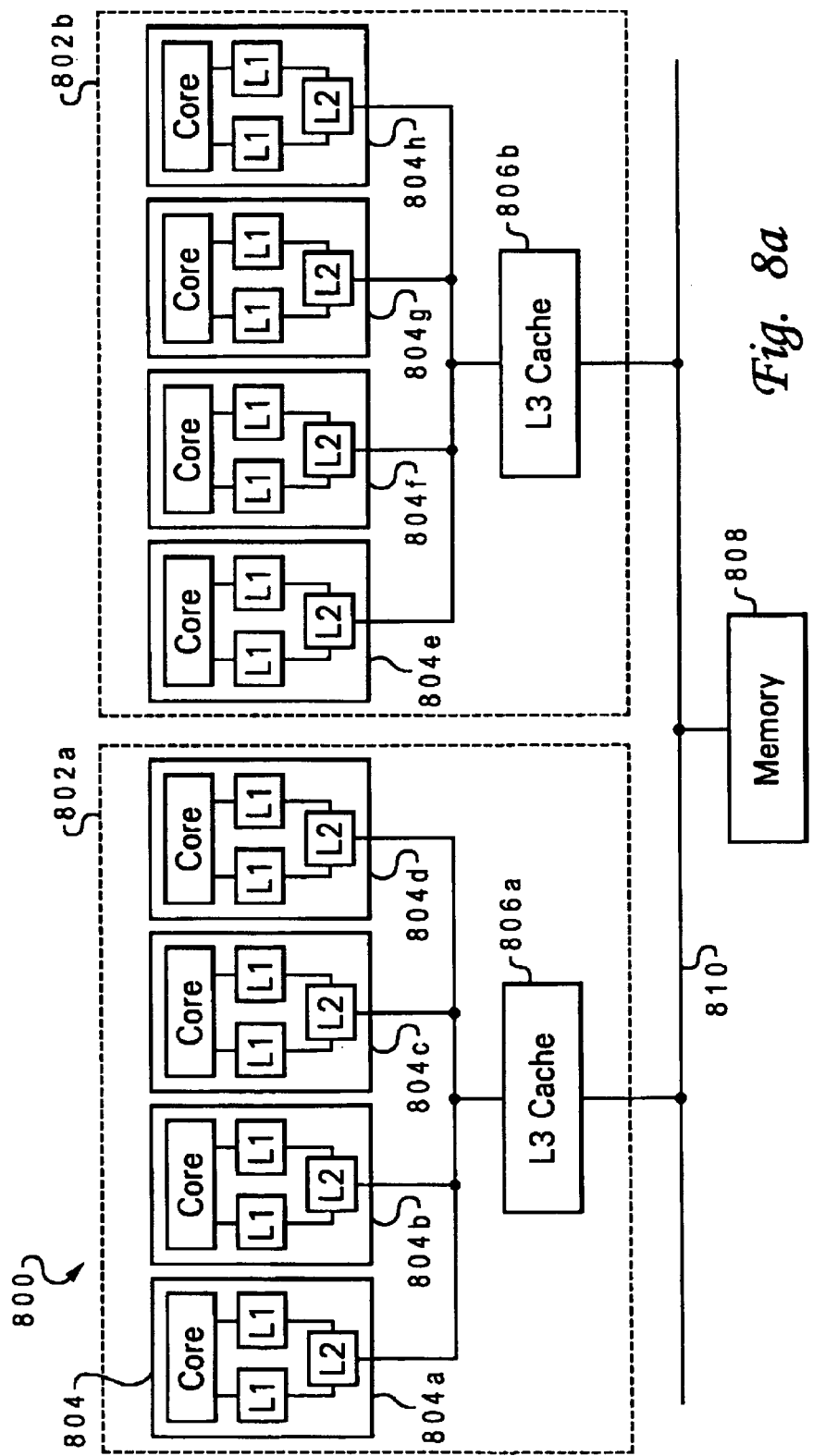
FIGS. 8a and 8b illustrate a cluster multi-processor incorporating the present invention.
Figure 8B:
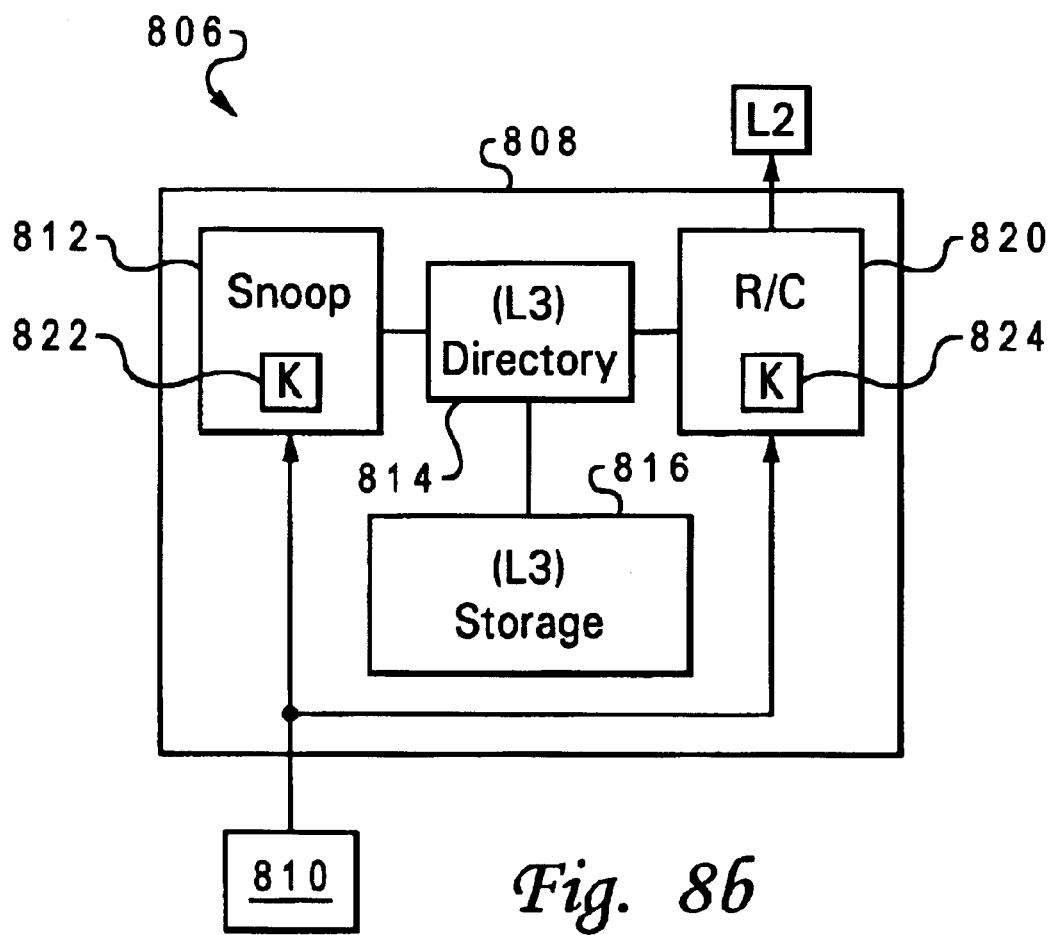

Referring now to FIG. 8, there is depicted another variation of a multi-processor computer in which the present invention may be implemented. Computer system 800 includes CPU clusters 802, of which two (CPU clusters 802a and 802b) are depicted. Each CPU cluster 802 has multiple CPU's 804, each having a processor core with on-board (L1) instruction and data caches, and an L2 cache. The L2 caches of each of the CPU's 804 are connected to a shared level-three (L3) cache 806, which is connected to a system memory 808 via a generalized interconnect such as system bus 810.

L3 cache 806 includes an L3 directory 814, an L3 storage 816, a snoop queue 812 including a kill-bit (K-bit) 822, and a read/claim (R/C) queue 820 including a K-bit 824. L3 cache 806 utilizes the kill bits 822 and 824 in a manner analogous to that described above for FIGS. 5–7, allowing a kill command to be received while a cache line is being used by the receiving processor.

Figure 9:
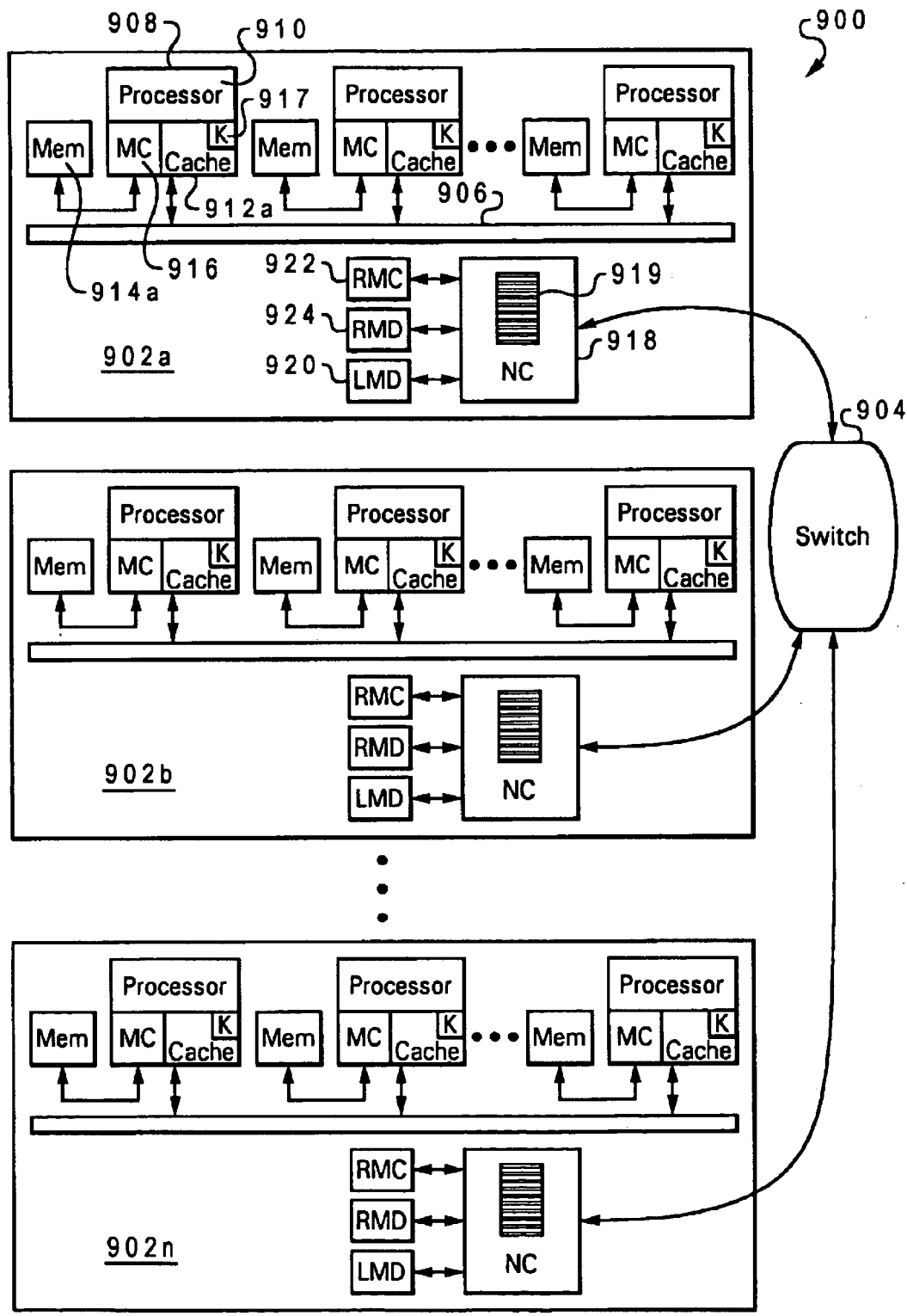
FIG. 9 depicts a NUMA computer incorporating the present invention.

The present invention may also be utilized in a non-uniform memory access (NUMA) multi-processor, such as depicted in FIG. 9. NUMA computer system 900 includes a number of nodes 902 connected by a switch 904. Each node 902, which can have the architecture of an SMP system, includes a local interconnect 906 to which number of processing units 908 are coupled. Processing units 908 each contain a central processing unit (CPU) 910 and associated cache hierarchy 912. At the lowest level of the volatile memory hierarchy, nodes 902 further contain a system memory 914, which may be centralized within each node 902 or distributed among processing units 908 as shown. CPUs 910 access memory 914 through a memory controller 916. In a preferred embodiment, kill-bit (K-bit) 917 is stored within the snoop queue and the R/C queue, where K-bit 917 functions as described above to allow a kill command to be received while a cache line is in use, and killing the cache line after use of the cache line is completed.

Each node 902 further includes a respective node controller (NC) 918, which maintains data coherency and facilitates the communication of requests and responses (both graphically depicted as 919) between nodes 902 via switch 904. Each node controller 918 has an associated local memory directory (LMD) 920 that identifies the data from local system memory 914 that are cached in other nodes 902, a remote memory cache (RMC) 922 that temporarily caches data retrieved from remote system memories, and a remote memory directory (RMD) 924 providing a directory of the contents of RMC 922.

The present invention therefore provides a mechanism for permitting a cache line kill command to be received by a processor and cache that are in the process of using the cache line to be killed. By permitting such unrestricted receipt of the kill commands, the potential of a live lock caused by repeated "retry" responses is avoided. While examples have shown a live lock resulting from other processors attempting to read the cache line being modified, it should also be apparent to one skilled in the art that the present invention also alleviates live locks resulting from multiple processors that are attempting to write to a cache line.

It should be appreciated that the method described above can be embodied in a computer program product in a variety of forms, and that the present invention applies equally regardless of the particular type of signal bearing media utilized to actually carry out the method described in the invention. Examples of signal bearing media include, without limitation, recordable type media such as floppy disks or compact disk read-only memories (CD ROMS) and transmission type media such as analog or digital communication links.

While the invention has been particularly shown and described with reference to a preferred embodiment, it will be understood by those skilled in the art that various changes in form and detail may be made therein without departing from the spirit and scope of the invention.

What is claimed is:

1. A method for maintaining cache coherency in a multi-processor computer system, said method comprising:

receiving a kill command from a second processor at a first processor, wherein said kill command requests invalidation of a cache line held in a cache of said first processor;

if said first processor is using said cache line, setting a kill indicator in said cache of said first processor to indicate a pending kill command for said cache line;

sending an acknowledgment responsive to setting said kill indicator from said first processor to said second processor to acknowledge invalidation of said cache line in said cache of said first processor; and responsive to said kill indicator, completing use of said cache line in said first processor and then subsequently invalidating said cache line in said cache of said first processor.

2. The method of claim 1, said method further comprising: modifying said cache line by said second processor.

3. The method of claim 1, wherein said cache of said first processor is a level-two (L2) cache, and wherein said L2 cache is a source and receiver of data that is shared with an L2 cache in a second processor.

4. The method of claim 3, said method further comprising invalidating said cache line in a level-one (L1) cache memory associated with said first processor.

5. The method of claim 1, wherein said acknowledgment signal is sent before said completion of said use of said cache line in said first processor.

6. The method of claim 1, wherein said kill indicator is stored in a snoop queue in an L2 cache associated with said first processor.

7. The method of claim 1, wherein said kill indicator is stored in a read/claim (R/C) queue in an l2 cache associated with said first processor.

8. The method of claim 1, wherein said cache line is in use by said first processor if a request for access to said cache line is pending in a queue of said first processor.

9. A first processor in a computer system having multiple processors, said first processor comprising:

means for receiving a kill command from a second processor at a first processor, wherein said kill command requests invalidation of a cache line held in a cache of said first processor;

means for, if said first processor is using said cache line, setting a kill indicator in said cache of said first processor to indicate a pending kill command for said cache line;

means for sending an acknowledgment responsive to setting said kill indicator from said first processor to said second processor to acknowledge invalidation of said cache line in said cache of said first processor; and means for, responsive to said kill indicator, completing use of said cache line in said first processor and then subsequently invalidating said cache line in said cache of said first processor.

10. The first processor of claim 9, wherein said computer system further comprises means for modifying said cache line by said second processor.

11. The first processor of claim 9, said first processor further comprising:

means for invalidating said cache line in a level-one (L1) cache memory associated with said first processor.

12. The first processor of claim 9, wherein said first processor sends said acknowledgment signal before said completion of said use of said cache line in said first processor.

13. The first processor of claim 9, said first processor further comprising:

a snoop queue in an L2 cache in which said kill indicator is stored.

14. The first processor of claim 9, said first processor further comprising:

a read/claim (R/C) queue in an L2 cache in which said kill indicator is stored.

15. A data processing system comprising:

the first processor of claim 9;

said second processor; and an interconnection connecting said first processor to said second processor.

16. A first processor in a computer system having multiple processors, said first processor comprising:

a cache memory;

a cache control logic having a snoop queue and a read/claim (R/C queue; and a means for storing a kill indicator, said kill indicator being set in said snoop queue or said R/C queue when said first processor is using a cache line in said cache memory and said first processor receives a kill command from a second processor to invalidate said cache line in said cache memory of said first processor, wherein said first processor sends an acknowledgment response to said second processor while said first processor continues using said cache line.

17. The first processor of claim 16, wherein said cache line is in use by said first processor if a request for access to said cache line is pending in a queue of said first processor.

18. A data processing system comprising:

the first processor of claim 16;

said second processor; and an interconnection connecting said first processor to said second processor.

* * * * *

UNITED STATES PATENT AND TRADEMARK OFFICE
CERTIFICATE OF CORRECTION

PATENT NO. : 6,944,721 B2
APPLICATION NO. : 10/216625
DATED : September 13, 2005
INVENTOR(S) : Ravi Kumar Arimilli et al.

It is certified that error appears in the above-identified patent and that said Letters Patent is hereby corrected as shown below:

Claim 7, at column 10, line 58, delete "12" and insert --L2--.

Signed and Sealed this

Eighth Day of May, 2007

JON W. DUDAS
*Director of the United States Patent and Trademark Office*